US008862605B2

(12) United States Patent
Spangler (10) Patent No.: US 8,862,605 B2
(45) Date of Patent: Oct. 14, 2014

(54) SYSTEMS, METHODS AND COMPUTER PROGRAM PRODUCTS FOR DISCOVERING A TEXT QUERY FROM EXAMPLE DOCUMENTS

(75) Inventor: William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/300,431

(22) Filed: Nov. 18, 2011

(65) Prior Publication Data

US 2013/0132418 A1    May 23, 2013

(51) Int. Cl.
G06F 17/30     (2006.01)

(52) U.S. Cl.
CPC ................ *G06F 17/30663* (2013.01)
USPC ........................................................ 707/759

(58) Field of Classification Search
CPC .................. G06F 17/30663; G06F 17/30616
USPC ........................................................ 707/759
See application file for complete search history.

(56) References Cited

U.S. PATENT DOCUMENTS

| 6,876,998 | B2 * | 4/2005 | Evans | 1/1 |
| 7,299,221 | B2 * | 11/2007 | Alpha et al. | 1/1 |
| 8,452,766 | B1 * | 5/2013 | Gomes et al. | 707/728 |
| 2005/0234880 | A1 * | 10/2005 | Zeng et al. | 707/3 |
| 2006/0036593 | A1 * | 2/2006 | Dean et al. | 707/4 |
| 2006/0167842 | A1 * | 7/2006 | Watson | 707/3 |
| 2007/0136251 | A1 * | 6/2007 | Colledge et al. | 707/3 |
| 2007/0198506 | A1 * | 8/2007 | Attaran Rezaei et al. | 707/5 |
| 2008/0010268 | A1 * | 1/2008 | Liao et al. | 707/5 |
| 2008/0208833 | A1 * | 8/2008 | Basmov | 707/5 |
| 2009/0198667 | A1 * | 8/2009 | Groeneveld et al. | 707/5 |
| 2010/0153440 | A1 * | 6/2010 | Hubert | 707/769 |
| 2010/0161584 | A1 * | 6/2010 | Lindblad et al. | 707/706 |
| 2010/0250547 | A1 * | 9/2010 | Grefenstette et al. | 707/740 |
| 2011/0047161 | A1 * | 2/2011 | Myaeng et al. | 707/740 |
| 2011/0066611 | A1 * | 3/2011 | Groeneveld et al. | 707/723 |
| 2011/0179012 | A1 * | 7/2011 | Pedersen | 707/710 |
| 2011/0252030 | A1 * | 10/2011 | Spangler | 707/729 |
| 2011/0302162 | A1 * | 12/2011 | Xiao et al. | 707/724 |
| 2011/0313992 | A1 * | 12/2011 | Groeneveld et al. | 707/706 |
| 2012/0131021 | A1 * | 5/2012 | Blair-Goldensohn et al. | 707/750 |

OTHER PUBLICATIONS

Qi He; Spangler, W.S.; Bin He; Ying Chen; Kato, L. "Prospective Client Driven Technology Recommendation", SRII Global Conference (SRII), 2012 Annual, on pp. 110-119.*
Spangler, S.; Ying Chen; Kreulen, J.; Boyer, S.; Griffin, T.; Alba, A; Kato, L.; Lelescu, A,; Su Yan. "Simple: Interactive Analytics on Patent Data", 2010 IEEE International Conference on Data Mining Workshops, 2010.*

* cited by examiner

*Primary Examiner* — Sheree Brown
(74) *Attorney, Agent, or Firm* — Kenneth L. Sherman, Esq.; Michael Zarrabian, Esq.; Sherman & Zarrabian LLP (57) ABSTRACT

Discovering a keyword query corresponding to an input collection of documents taken from a candidate pool includes selecting a document from a working set as the input set, and extracting a list of snippets in the selected document. For each snippet, executing a set of proximity queries based on selected terms in that snippet, and finding all possible proximity queries that return less than N query results from the candidate pool. A query is selected from said proximity queries, based on the selected query returning the greatest number of working set documents, and returning the smallest number of documents not in the working set. Documents returned by the selected query are removed from the working set, and the above steps are repeated until no documents remain in the working set. The disjunction of selected queries is returned as the discovered query.

20 Claims, 6 Drawing Sheets

SYSTEMS, METHODS AND COMPUTER PROGRAM PRODUCTS FOR DISCOVERING A TEXT QUERY FROM EXAMPLE DOCUMENTS

FIELD OF THE INVENTION

The present invention generally relates to information search and retrieval, and more particularly, to a system, method and computer program products for discovering a text query from example documents.

BACKGROUND

The ability to find material relevant to a small collection of documents from a large collection of documents (i.e., similar document retrieval), is a well known and long studied problem. The current best approach to solving this problem is based on measuring cosine similarity to a keyword index of the document corpus. However these indexes, once built, make a limiting assumption about the granularity of the similarity being searched for. The assumption is that documents in an input set of documents are "overall" similar to documents in the large collection. This means that the overall term frequency of each document must be relatively similar before the match can be discovered. For long documents, this is not a reasonable assumption to make. The search index is basically built at the wrong level of detail to provide information on individual sentences and paragraphs that make up each document.

BRIEF SUMMARY

Embodiments of the present invention provide a system, method and computer program products for discovering a text query from example documents.

An exemplary embodiment includes discovering a query by iteratively processing a working set comprising a collection of documents from a candidate pool, for discovering a corresponding keyword query. Iteratively processing comprises: for each snippet in a document selected from the working set, executing a set of proximity queries based on that snippet, and finding proximity queries that return less than a predefined number of query results from the candidate pool; selecting a query from said proximity queries, wherein the selected query returns the greatest number of working set documents and the smallest number of documents not in the working set; and removing, from the working set, documents returned by the selected query.

The working set is processed until no documents remain in the working set. The disjunction of selected queries is returned as the discovered query. The discovered query returns as results the input collection along with additional related documents from the candidate pool.

Another exemplary embodiment includes a method for discovering a keyword query corresponding to an input collection of documents taken from a candidate pool. The method includes processing a working set of documents until no documents remain in the working set. The processing includes selecting a document from a working set as the input set, and extracting a list of snippets in the selected document. The processing further includes, for each snippet, executing a set of proximity queries based on selected terms in that snippet, and finding all possible proximity queries that return less than N query results from the candidate pool. The processing further includes selecting a query from said proximity queries, based on: a first criterion for the selected query returning the greatest number of working set documents, and a second criterion for the selected query returning the smallest number of documents not in the working set. The processing further includes removing, from the working set, documents returned by the selected query, and repeating the above steps until no documents remain in the working set. The method further includes returning, as the discovered query, the disjunction of selected queries.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Currently, many search indexes do contain information about the positional location of words in documents. A discovery approach according to an embodiment of the present invention leverages this information to scan a document collection for candidate textual patterns and find the section or sections that are most relevant to a search input. The approach then further dissects the text content of the best documents returned by the search index to find the nearest matching content to the original text input. This matching content can then be used to determine queries for returning as much of the original input document set as possible, while obtaining as few as possible additional documents.

As such, according to an embodiment of the invention, the approach finds the precise textual features that documents in an input target set of documents (i.e., input set) have in common, and then discovers other documents (i.e., related documents) in a large document collection that share these features. The individual sentences (snippets) and paragraphs that make up each document are utilized rather than the overall content of each document.

According to an embodiment of the invention, a sentence may include any snippet of text extracted from a document. A list of snippets may encompass the entire document.

Typical search inputs are a variation of logical Boolean keyword expressions while the output is a set of matching documents. Embodiments of the present invention employ search indexes to find a query that reflects the content of the input document set. For a set of similar example documents, a discovery approach according to an embodiment of the present invention finds the simplest text query that returns those examples, and as few additional documents as possible. Because the documents in a collection may be quite long (e.g., 1000 or more) and the number of documents in the input set may be large (e.g., 100 or more), the combinatorics of the collection make it intractable to devise an optimum query. Embodiments of the present invention provide an approach for finding a query that always returns a given input set and a number of additional documents (e.g., a few hundred). Such a query can be useful for retrieving any material textually related to the original input document set.

First described is a basic discovery approach according to an embodiment of the invention, which assumes a single proximate query that finds the greatest possible number of original input documents while not finding many documents that are not in the input set. Next described, is an iterative approach to expand the query in a greedy fashion until all the input documents are so found, according to an embodiment of the invention.

The discovery approach comprises a discovery process for determining a text query from example documents (i.e., discovery process), which finds the best proximate query for a given input set comprising an input target set of documents. The discovery process utilizes proximal searching to generate a candidate set of proximate queries for evaluation. Proximal searching comprises creating relevant queries from an input document. The input text for proximal searching comprises the text of the most representative document in an original set of input documents.

The input text can be found by generating a vector space model over this collection of snippets (e.g., a set of words or bag-of-words), and then finding the centroid of the input documents. An input document that is "closest" to the centroid (e.g., using cosine similarity) is the "most typical" document. As such, a most typical document is selected in view of most typical sorting based on dictionary vector space similarity.

Given the most typical document, the text is extracted and utilized in executing a proximal search on an index of a larger candidate pool of documents (which also contain the input documents). Each query comprises a proximate query containing from 1-10 words. Each query result is bounded by an upper limit, N, which is user determined. The size of N will determine the maximum number of total documents to be returned by the final query that is discovered.

Each search query is executed and the resulting documents from query executions are compared to the input set. The best search query is the one that returns the most input documents while returning less than N results. If two queries return the same number of input documents then the best query is the one that returns the fewest overall documents.

The above process for finding the best proximate query for a given input set can be iteratively repeated on the set of input documents which have not yet been found. Each iteration results in a new proximate query, which can be added to the overall query as a logical OR clause. A total resulting query comprises a logical OR of the proximate queries. Each iteration reduces the overall input set by at least one document (as long as all input documents are indexed and contain some text). Thus, the overall process is guaranteed to complete eventually.

Figure 1:
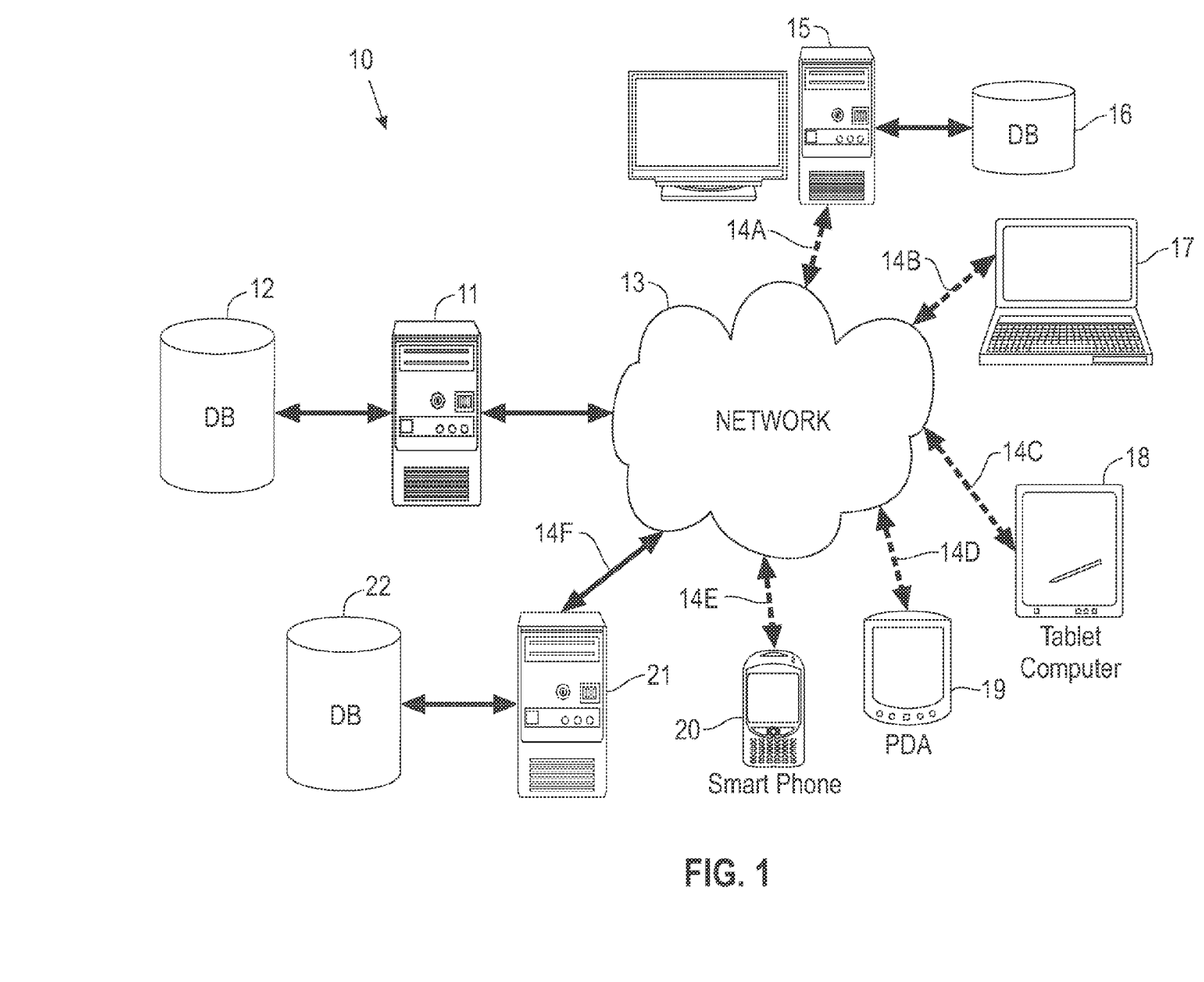
FIG. 1 is a block diagram illustrating an example of the network environment for discovering a text query from example documents, according to an embodiment of the present invention.

Referring now to the drawings, in which like numerals illustrate like elements throughout the several views, FIG. 1 illustrates an example of the basic components of a system 10 utilizing a discovery system for determining a text query from example documents (i.e., discovery system) used in connection with a preferred embodiment of the present invention. The system 10 includes a server 11 and the remote devices 15 and 17-20 that utilize the discovery system of the present invention.

Each of the remote devices 15 and 17-20 has applications and can have a local database 16. Server 11 contains applications, and a database 12 that can be accessed by remote device 15 and 17-20 via connections 14(A-F), respectively, over network 13. The server 11 executes administrative software for a computer network and controls access to itself and database 12. The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request relevant material from a large collection of documents. Thus, when a user at one of the remote devices 15 and 17-20 desires to access said discovery process from the database 12 at the server 11, the remote device 15 and 17-20 communicates over the network 13, to access the server 11 and database 12.

Third party computer systems 21 and databases 22 can be accessed by a discovery system 100 on server 11 (FIG. 2) in order to provide access to additional collections of documents and/or search indexes. The discovery system 100 utilizes the discovery process for determining a text query from example documents, according to an embodiment of the invention. Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
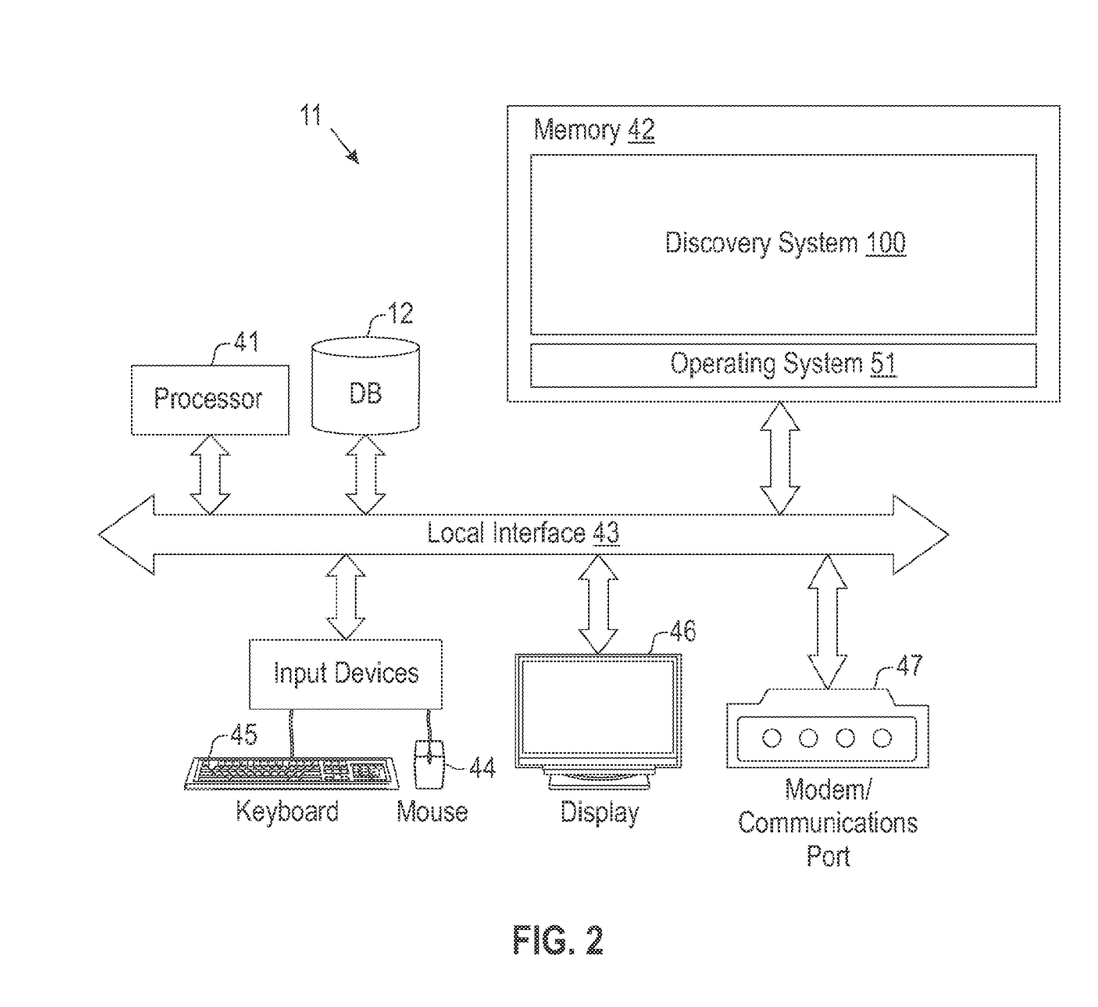
FIG. 2 is a block diagram illustrating an example of a server utilizing a process for discovering a text query from example documents, according to an embodiment of the present invention, as shown in FIG. 1.

Illustrated in FIG. 2 is a block diagram demonstrating an example of server 11, as shown in FIG. 1, utilizing the system 100 according to an embodiment of the present invention. Server 11 includes, but is not limited to, PCs, workstations, laptops, PDAs, palm devices and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor. An example of a suitable commercially available microprocessor is a PowerPC microprocessor from IBM, U.S.A.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

When the system 100 is implemented in software, as is shown in FIG. 2, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to an Internet browser.

The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. Hereinafter, the remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3:
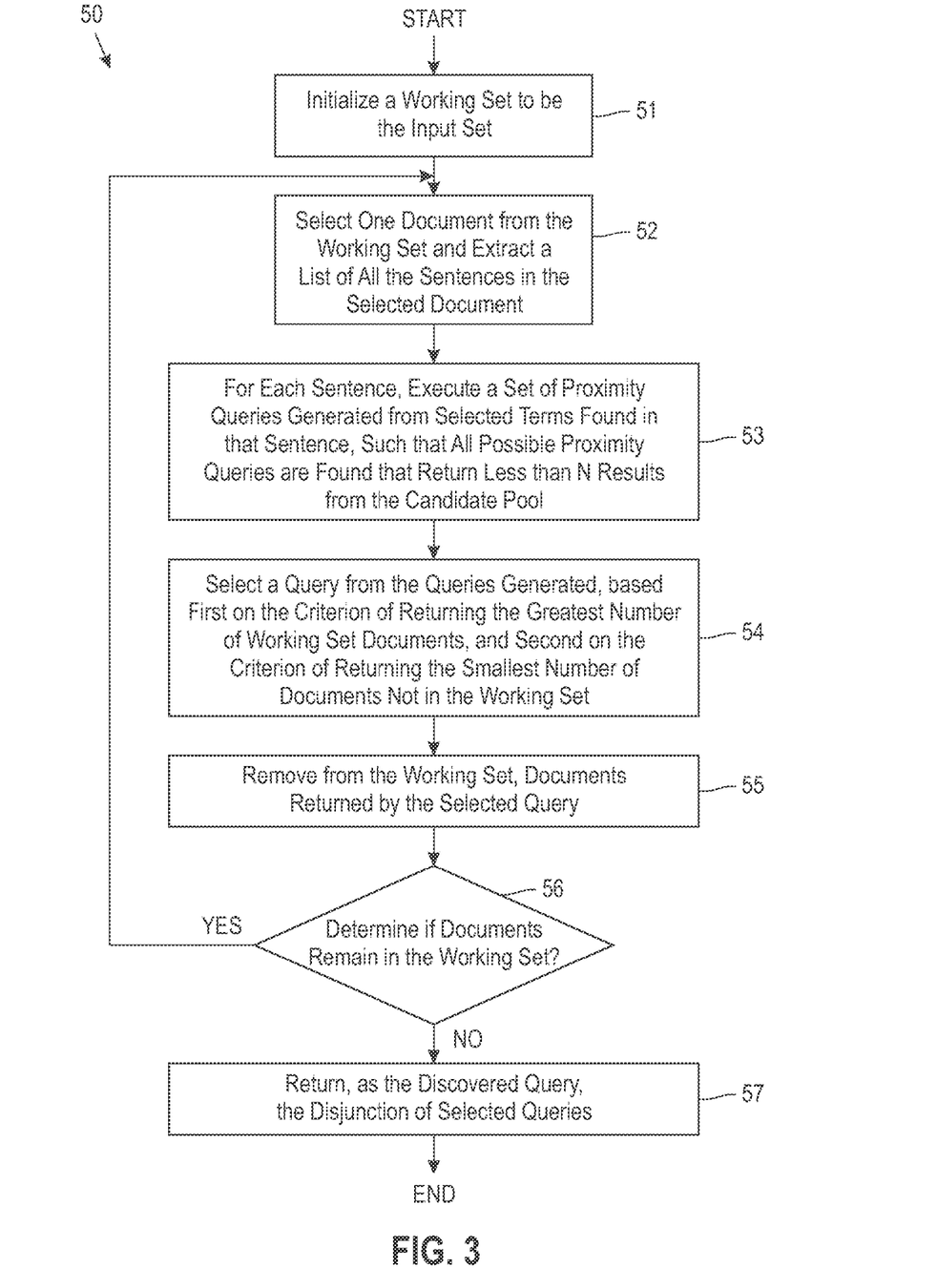
FIG. 3 shows a flowchart illustrating a discovery process for determining a keyword query corresponding to an input collection of documents taken from a candidate pool, wherein the discovered query returns the input collection along with additional related documents from the candidate pool, according to an embodiment of the present invention.

FIG. 3 is a flowchart of a process 50 for the system 100, for discovering a keyword query corresponding to an input collection of documents taken from a candidate pool according to an embodiment of the invention. The discovered query returns the input collection along with additional related documents from the candidate pool. Process block 51 comprises initializing a working set to be the input set.

Process block 52 comprises selecting one document from the working set and extracting a list of all the sentences in the selected document. Process block 53 comprises, for each sentence, executing a set of proximity queries generated from selected terms found in that sentence, such that all possible proximity queries are found that return less than N results from the candidate pool (wherein N is a pre-specified threshold).

Process block 54 comprises selecting a query from the queries generated in the process block 53, based first on the criterion of returning the greatest number of working set documents, and second on the criterion of returning the smallest number of documents not in the working set. Process block 55 comprises removing from the working set, documents returned by the selected query.

Process block 56 comprises determining if documents remain in the working set, wherein if no documents remain, then the process proceeds to process block 57, otherwise the process proceeds back to block 52 for blocks 52-55 to be repeated (until no documents remain in the working set). Process block 57 comprises returning, as the discovered query, the disjunction of selected queries. The document selected in process block 52 may be selected in view of most typical sorting based on dictionary vector space similarity.

Figure 4A:
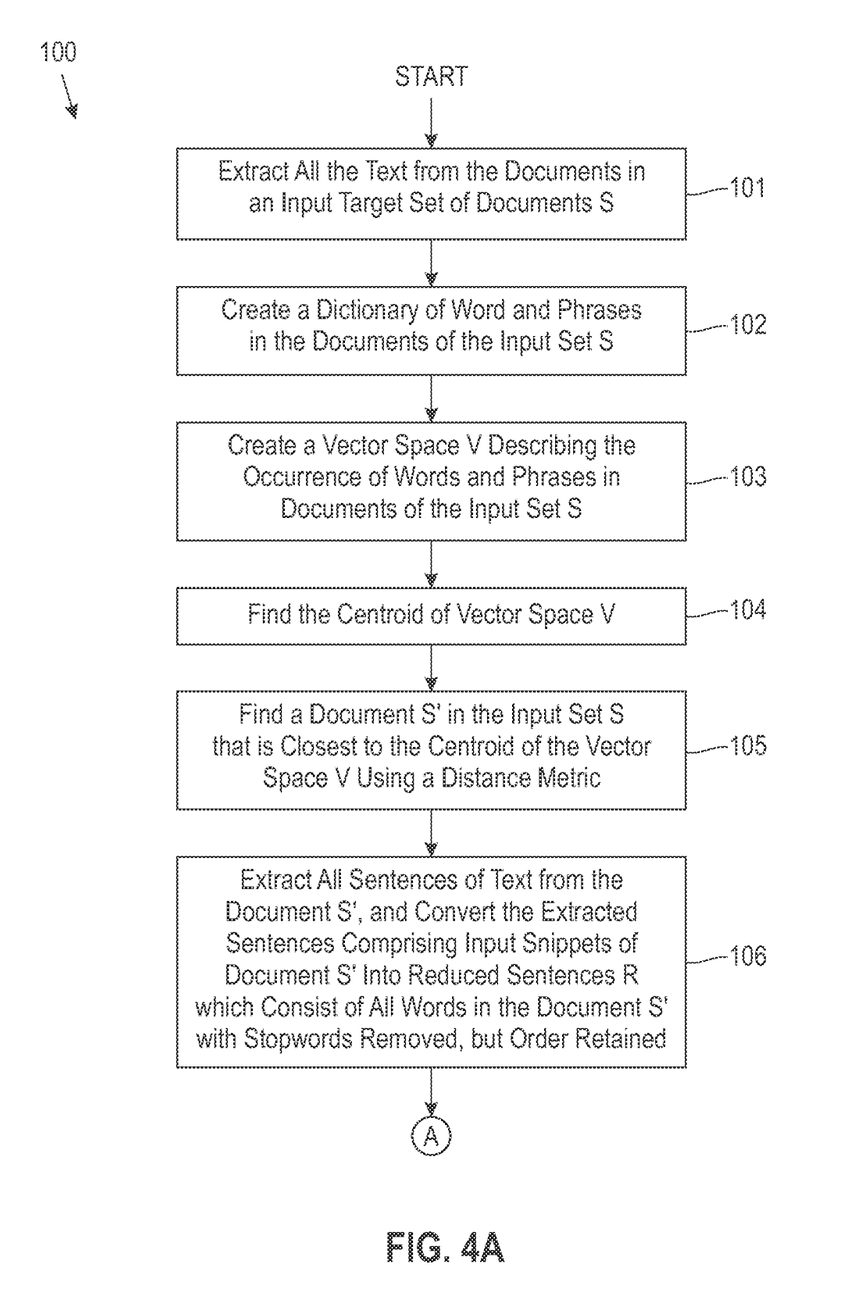
FIGS. 4A-4C show a flowchart illustrating a discovery system utilized by a server, as shown in FIG. 2, according to an embodiment of the present invention.
Figure 4B:
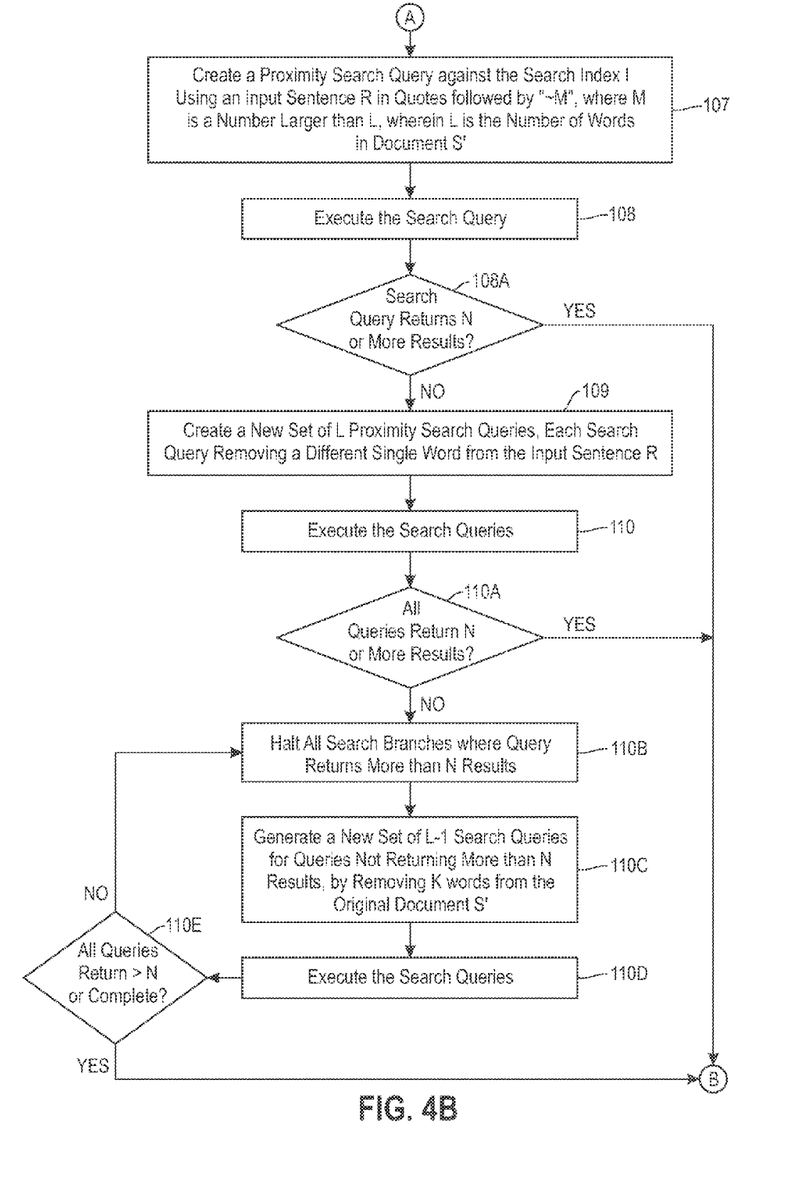
Figure 4C:
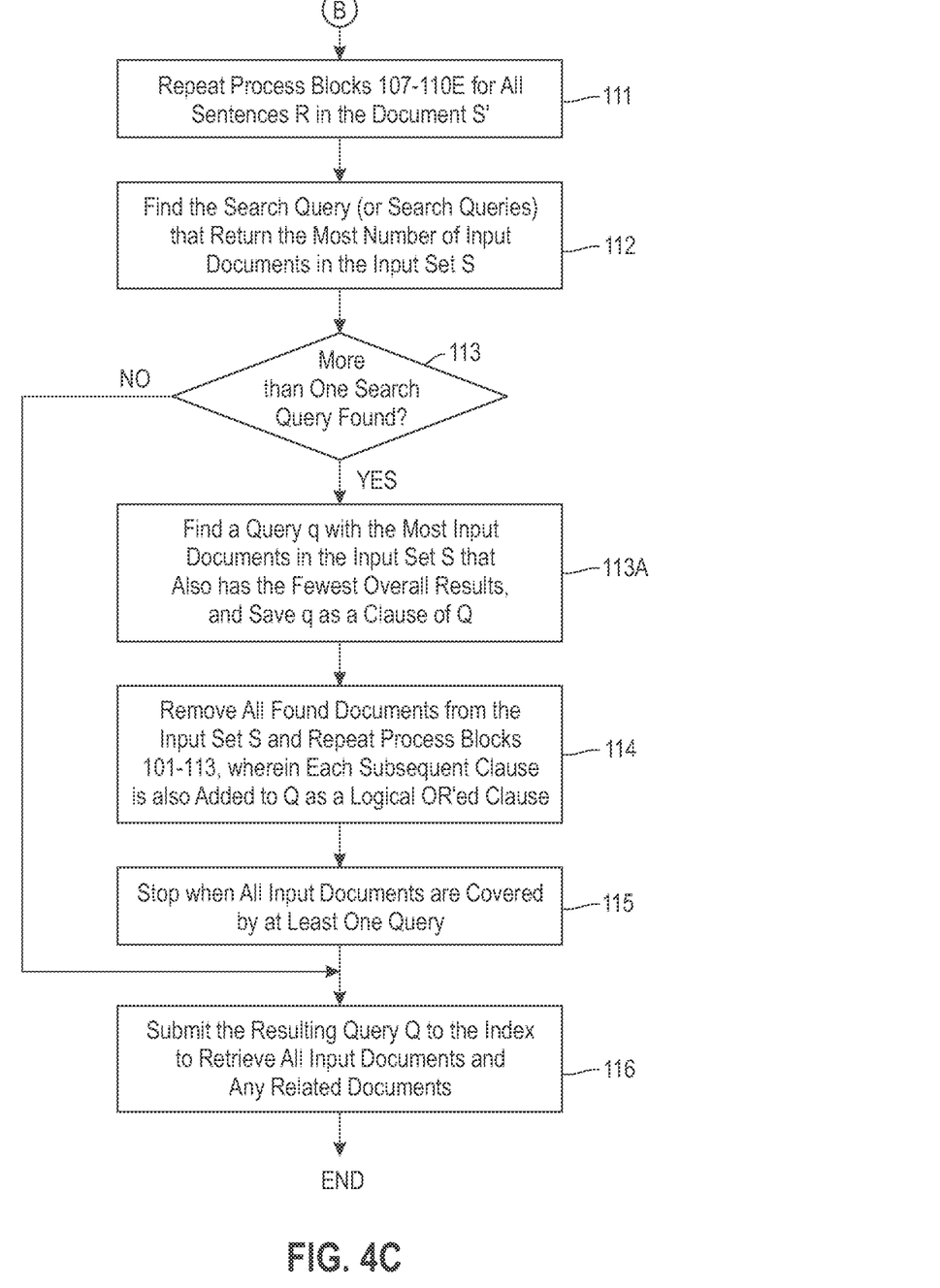

FIGS. 4A-4C show a flowchart illustrating an example of the operation of the system 100 utilized by the server 11, as show in FIG. 2. The system 100 of the present invention provides a system and methodology for employing search indexes to find a query that reflects the content of an input document set. For a set of similar example documents, the query is the simplest text query that returns those examples, and as few additional documents as possible.

Given a small input target set of documents (S), a document corpus (C), a search index (I), and an approximate number of documents to return (N), first at process block 101, the system 100 is initialized. This initialization includes the startup routines and processes embedded in the BIOS of the server 11. The initialization also includes the establishment of data values for particular data structures utilized in the system 100.

In process block 101, the system 100 extracts all the text from the documents in the input target set of documents S (i.e., input set S). In process block 102, the system 100 creates a dictionary of words and phrases in the documents of the input set S. In process block 103, the system 100 creates a vector space (V) describing the occurrence of words and phrases in documents of the input set S.

In process block 104, the system 100 finds the centroid of vector space V. In process block 105, the system 100 finds a document S' in the input set S that is closest to the centroid of the vector space V using a distance metric such as cosine distance. In process block 106, the system 100 extracts all the sentences of text from the document S', and converts the extracted sentences comprising input snippets of document S' into reduced sentences R which consist of all words in the document S' with stopwords removed, but order retained. For example, for a snippet: "unlocking the business value in unstructured information", the stop words are removed to create an input for a proximity query as: "unlocking business value unstructured information".

In process block 107 (FIG. 4B), the system 100 creates a proximity search query, using known methods, against the search index I using an input sentence R in quotes followed by "~M", where M is a number larger than L, wherein L is the number of words in document S'. This indicates that all the words in document S' should occur within a distance of M words of each other.

In process block 108, the system 100 executes the search query. In process block 108A it is determined if the search query returns N or more results. If yes, proceed to process block 111. Otherwise, in process block 109 for the search query returning fewer results, the system 100 creates a new set of L proximity search queries, each search query removing a different single word from the input sentence R.

In process block 110, the system 100 executes all of the search queries. In process block 110A, it is determined if all queries return N or more results. If yes, the system 100 proceeds to process block 111. If not, in process block 110B, the system 100 halts all search branches where search query returns more than N results. As such, any search query branch that returns more than N results is halted. In process block 110C, for any search query branch returning fewer than N results, the system 100 generates a new set of L−1 search queries, removing K words from the original document S' (e.g., K=2).

In process block 110D the system 100 executes the new search queries. In process block 110E the system 100 determines if all queries returned more than N results or completed. If not, the system 100 proceeds to process block 110B. The system 100 continues until all of the search query branches have completed or returned a result of size larger than N (at most this may theoretically result in $L^2-1$ total queries, though in practice it is usually much fewer), and then proceeds to process block 111.

In process block 111 (FIG. 4C), the system 100 repeats process blocks 107-110E for all sentences R in the document S'. In process block 112, the system 100 finds a search query (or search queries) that return the most number of input documents in the input set S. In process block 113, it is determined if more than one query is found in process block 112. If not, the system 100 proceeds to process block 116 with the one found query as query Q. Otherwise, in process block 113A the system 100 finds a query q with the most input documents in the input set S that also has the fewest overall results, and save query q as a clause of Q. In process block 114, the system 100 removes all found documents from the input set S and repeats process blocks 101-113. Each subsequent clause is also added to Q as a logical OR'ed clause.

In process block 115, the system 100 stops when all input documents are covered by at least one query. In process block 116, the system 100 submits the resulting query Q to the index to retrieve all input documents and any related documents.

An example application of the system 100 according to an embodiment of the invention is now described. The input set comprises a list of n (e.g., 26 documents). To find approximately m (e.g., 100) documents containing text most similar to the input documents, the input is processed against a document corpus and index. First, a centroid consisting of feature vectors for all n documents is created. Each document is presented as a vector of weighted frequencies of the document features of words and phrases. In one embodiment, a term weighting scheme is utilized. This weighting scheme emphasizes words with high frequency in a document, and normalizes each document vector to have unit Euclidean norm. For example, if in a document were the sentence, "We have no bananas, we have no bananas today," and the dictionary consisted of only two terms, "bananas" and "today", then the unnormalized document vector would be {2 1} (to indicate two bananas and one today), and the normalized version would be: $[2/\sqrt{5}, 1/\sqrt{5}]$.

The words and phrases that make up the document feature space are determined in a first pass through the data for counting which words occur most frequently (in the most documents) in the text. A standard "stop word" list is used to eliminate words such as "and", "but", and "the". In one embodiment, the top M words are retained in the first pass, where the value of M may vary depending on the length of the documents, the number of documents and the number of categories to be created.

After selecting the words in the first pass, a second pass through the data counts the frequency of the phrases that occur using these words. A phrase is considered to be a sequence of two words occurring in order without intervening non-stop words. Pruning is used to keep only the M most frequent words and phrases. This becomes the feature space. A third pass through the data indexes the documents by their feature occurrences. Stemming may be used as desired to create terms from similar word forms.

Then, each document in the set is evaluated based on nearness to the centroid using a metric such as cosine distance between every snippet vector and the vector representing the text input, as follows:

$$\cos(X, Y) = \frac{X \cdot Y}{\|X\| \cdot \|Y\|}$$

Each of the remaining documents is evaluated based on nearness to this centroid resulting in a document being selected. A best proximal query for the document is determined and executed, which returns a set of documents from the original input set.

The remaining documents are used to create a new centroid. Each of the remaining documents is evaluated based on nearness to this centroid resulting in a document being selected. The process continues until a query is generated which finds the related documents (i.e., similar documents).

Each query is executed and the resulting documents are compared to the input. The best query is the one that returns the most input documents while returning less than N results. If two queries return the same number of input documents then the best query is the one that returns the fewest overall documents.

The process described above for finding the best proximate query for a given input set, can be iteratively repeated on the set of input documents which have not yet been found. Each iteration produces a new proximate query which can be added to the overall query as an OR clause. The total resulting query will then be an OR of proximate queries. Each iteration will reduce the overall input set by at least one document (as long as all input documents are indexed and contain some text). As such, the process discovers a precise query that returns a given document input set along with a small number of additional related documents. The approach is also useful with known sets of data related material to a given collection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for discovering a keyword query corresponding to an input collection of documents taken from a candidate pool, the method comprising:
  (a) initializing a document working set to be a document input set for determining a particular document as a representative document for the document working set;
  (b) processing the document working set until no documents remain in the document working set, wherein said processing comprises:
     selecting the representative document from the document working set and extracting a list of snippets in the selected document;
     for each snippet, executing a set of proximity queries based on selected terms in that snippet, and finding all possible proximity queries that return less than N query results from the candidate pool;
     selecting a query from said proximity queries, based on: a first criterion for the selected query returning the greatest number of working set documents, and a second criterion for the selected query returning the smallest number of documents not in the document working set; and
     removing, from the document working set, documents returned by the selected query; and
  (c) returning, as a discovered keyword query, a disjunction of selected queries.

2. The method of claim 1, wherein the selected document is selected in view of most typical sorting based on a dictionary vector space similarity.

3. The method of claim 1, wherein selecting the representative document from the document working set comprises:
  generating a vector space model over a collection of snippets;
  finding a centroid of the document working set; and
  selecting a document in the document working set that is closest to said centroid and using the selected document for determining a proximal keyword query for returning a set of documents from the document input set.

4. The method of claim 1, wherein the discovered query returns as results the input collection along with additional related documents from the candidate pool.

5. The method of claim 1, wherein extracting a list of snippets in the selected document comprises extracting a list of all the snippets in the selected document.

6. The method of claim 5, comprising:
  for each said snippet, generating a set of proximity queries from selected terms found in the snippet and executing a set of proximity queries,
  such that all possible proximity queries are found that return less than N query results from the candidate pool.

7. The method of claim 5, wherein:
  at least one snippet comprises a sentence; and
  N is a pre-specified threshold.

8. A system for discovering a keyword query corresponding to an input collection of documents taken from a candidate pool, the system comprising:
  a processor;
  a document selection module that uses the processor to select a document as a representative document from a working set of documents used as a document input set;
  an extraction module that uses the processor to extract a list of snippets in the selected document;
  a query execution module that, for each snippet, uses the processor to execute a set of proximity queries based on selected terms in that snippet, wherein all possible proximity queries that return less than N query results from the candidate pool are found;
  a query selection module that uses the processor to select a query from said proximity queries, based on: a first criterion for the selected query returning the greatest number of working set documents, and a second criterion for the selected query returning the smallest number of documents not in the working set;

a removal module that uses the processor to remove, from the working set, documents returned by the selected query, and feeds back the working set to the document selection module until no documents remain in the working set; and an output module that returns, as a discovered keyword query, a disjunction of selected queries.

9. The system of claim 8, comprising:

a query generating module that, for each said snippet, generates a set of proximity queries from selected terms found in the snippet and executing a set of proximity queries;

a determination module that finds all possible proximity queries that return less than N query results from the candidate pool;

wherein the document selection module selects the selected document in view of most typical sorting based on a dictionary vector space similarity; and wherein the discovered keyword query returns as results the input collection along with additional related documents from the candidate pool.

10. The system of claim 8, wherein the document selection module generates a vector space model over a collection of snippets, finds the centroid of the working set of documents, and selects a document in the working set that is closest to said centroid, as the selected document and uses the selected document for determining a proximal keyword query for returning a set of documents from the document input set.

11. A method for discovering a query, the method comprising:

iteratively processing a working set comprising a collection of documents from a candidate pool, for discovering a corresponding keyword query, wherein iteratively processing comprises:

for each snippet in a document selected from the working set as a representative document, executing a set of proximity queries based on that snippet, and finding proximity queries that return less than a predefined number of query results from the candidate pool;

selecting a keyword query from said proximity queries, wherein the selected keyword query returns the greatest number of working set documents not in the working set based on a first criterion and returns the smallest number of documents not in the working set based on a second criterion; and removing, from the working set, documents returned by the keyword selected query.

12. The method of claim 11, comprising:

iteratively processing the working set until no documents remain in the working set; and returning, as the discovered keyword query, a disjunction of selected queries;

wherein the discovered query returns as results the input collection along with additional related documents from the candidate pool.

13. The method of claim 12, wherein:

the selected document is selected in view of most typical sorting based on a dictionary vector space similarity; and extracting snippets in the selected comprises extracting a list of all snippets in the selected document.

14. The method of claim 12, wherein selecting a document from the working set comprises:

generating a vector space model over a collection of snippets;

finding a centroid of the working set; and selecting a document in the working set that is closest to said centroid and using the selected document for determining a proximal keyword query for returning a set of documents from the working set.

15. A computer program product for discovering a keyword query corresponding to an input collection of documents taken from a candidate pool, the computer program product comprising:

a non-transitory tangible storage medium readable by a computer system and storing instructions for execution by the computer system for performing a method comprising:

(a) initializing a working set of documents to be an input set of documents;

(b) selecting a document from the working set as a representative document of the working set and extracting a list of sentences in the selected document;

(c) for each sentence, executing a set of proximity queries based on selected terms in that sentence, and finding all possible proximity queries that return less than N query results from the candidate pool;

(d) selecting a query from said proximity queries, based on: a first criterion for the selected query returning the greatest number of working set documents, and a second criterion for the selected query returning the smallest number of documents not in the working set;

(e) removing, from the working set, documents returned by the selected query;

(f) repeating steps (b)-(e) until no documents remain in the working set; and (g) returning, as a discovered keyword query, a disjunction of selected queries.

16. The computer program product of claim 15, wherein the selected document is selected in view of most typical sorting based on a dictionary vector space similarity.

17. The computer program product of claim 15, wherein a document is selected from the working set by:

generating a vector space model over a collection of sentences;

finding a centroid of the working set; and selecting a document in the working set that is closest to said centroid and using the selected document for determining a proximal keyword query for returning a set of documents from the input set of documents.

18. The computer program product of claim 15, wherein:

the discovered keyword query returns as results the input collection along with additional related documents from the candidate pool.

19. The computer program product of claim 15, wherein:

a list of all the sentences in the selected document is extracted.

20. The computer program product of claim 19, wherein:

for each said sentence, a set of proximity queries from selected terms found in the sentence is generated and a set of proximity queries is executed, such that all possible proximity queries are found that return less than N query results from the candidate pool.

* * * * *